(12) United States Patent
Frazer

(10) Patent No.: US 10,904,224 B2
(45) Date of Patent: Jan. 26, 2021

(54) AIRCRAFT ENGINE MONITORING SYSTEM

(71) Applicant: Rolls-Royce Corporation, Indianapolis, IN (US)

(72) Inventor: Brandon Frazer, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 248 days.

(21) Appl. No.: 15/719,816

(22) Filed: Sep. 29, 2017

(65) Prior Publication Data

US 2019/0104112 A1 Apr. 4, 2019

(51) Int. Cl.

| | |
|---|---|
| H04L 29/06 | (2006.01) |
| G06F 21/00 | (2013.01) |
| G06F 21/44 | (2013.01) |
| H04L 9/32 | (2006.01) |
| G06F 21/57 | (2013.01) |
| B64F 5/60 | (2017.01) |
| G07C 5/00 | (2006.01) |
| H04L 9/12 | (2006.01) |
| G07C 5/08 | (2006.01) |
| H04L 29/08 | (2006.01) |

(Continued)

(52) U.S. Cl.
CPC .......... *H04L 63/0428* (2013.01); *B64F 5/60* (2017.01); *G06F 21/445* (2013.01); *G06F 21/572* (2013.01); *G07C 5/008* (2013.01); *H04L 9/12* (2013.01); *H04L 9/32* (2013.01); *H04L 9/3273* (2013.01); *H04L 63/0869* (2013.01); *H04L 63/12* (2013.01); *B64D 43/00* (2013.01); *B64D 2045/0085* (2013.01); *F05D 2260/80* (2013.01); *G06F 2221/2103* (2013.01); *G07C 5/0808* (2013.01); *H04L 67/12* (2013.01); *H04L 2209/80* (2013.01); *H04L 2209/805* (2013.01); *H04L 2209/84* (2013.01)

(58) Field of Classification Search
CPC ..... H04L 63/0428; H04L 9/12; H04L 9/3273; H04L 63/12; H04L 2209/80; G06F 21/445; G07C 5/008; G07C 5/0808; B64F 5/60; B64D 2045/0085

See application file for complete search history.

(56) References Cited

U.S. PATENT DOCUMENTS 6,526,509 B1 2/2003 Horn et al.
7,360,075 B2 4/2008 VanHeyningen et al.
(Continued)

*Primary Examiner* — Jeffrey C Pwu
*Assistant Examiner* — Rodman Alexander Mahmoudi
(74) *Attorney, Agent, or Firm* — Brinks Gilson & Lione

(57) ABSTRACT

Various embodiments of the present disclosure provide an aircraft engine monitoring system. Generally, the aircraft engine monitoring system includes an engine monitoring device and one or more sensors configured to sense engine parameters of an engine of an aircraft and to generate and send signals representing the sensed engine parameters to the engine monitoring device, which stores them as engine performance data. An external device is communicatively connectable to the engine monitoring device to retrieve the engine performance data if both (1) the engine monitoring device determines that the external device is a trusted device and (2) the external device determines that the engine monitoring device is a trusted device, the engine monitoring device is configured to encrypt and securely transmit some or all of the engine performance data to the external device.

16 Claims, 3 Drawing Sheets

(51) Int. Cl.
  *B64D 43/00*   (2006.01)
  *B64D 45/00*   (2006.01)

(56) References Cited

U.S. PATENT DOCUMENTS

| | | | |
|---|---|---|---|
| 7,704,147 | B2 | 4/2010 | Quraishi et al. |
| 9,097,122 | B2 | 8/2015 | Borja |
| 9,463,325 | B1 * | 10/2016 | Young ................ A61N 1/37217 |
| 2002/0054635 | A1 * | 5/2002 | Nagai .................... H04L 47/10 |
| | | | 375/240.01 |
| 2005/0015489 | A1 | 7/2005 | Widman et al. |
| 2008/0059476 | A1 | 6/2008 | Alrabady |
| 2012/0177198 | A1 * | 7/2012 | Cabos ................... H04L 9/0825 |
| | | | 380/270 |
| 2015/0363981 | A1 * | 12/2015 | Ziarno ................. H04B 1/3822 |
| | | | 701/101 |
| 2016/0112203 | A1 * | 4/2016 | Thom ................... H04L 9/3247 |
| | | | 713/176 |
| 2017/0134164 | A1 | 5/2017 | Haga |
| 2017/0201520 | A1 * | 7/2017 | Chandoor ........... H04L 63/0853 |
| 2019/0075110 | A1 * | 3/2019 | Lawson ............. H04L 63/0876 |

* cited by examiner

AIRCRAFT ENGINE MONITORING SYSTEM

FIELD

The present disclosure relates to aircraft engine monitoring systems, and specifically to aircraft engine monitoring systems configured to collect engine performance data via sensors and to securely send the engine performance data to trusted external devices.

BACKGROUND

Gas turbine engines are complex machines that include thousands of interrelated components that work together to generate thrust by (generally) sucking air into the engine, compressing the air, aspirating fuel into the compressed air, and igniting the fuel/air mixture. It is desirable to monitor certain parameters of the engine, such as the rate movement of certain components, certain fluid flow rates, certain temperatures, certain pressures, and the like, to monitor and analyze the engine's performance. For instance, U.S. Pat. No. 9,097,122 discloses an engine monitoring system that includes a data acquisition system including engine sensors configured to sense engine pressure and temperature and to communicate data representing the sensed pressure and temperature to a transmitter, which in turn sends the data to a processing device for processing.

SUMMARY

Various embodiments of the present disclosure provide an aircraft engine monitoring system. Generally, the aircraft engine monitoring system includes an engine monitoring device and one or more sensors configured to sense engine parameters of an engine of an aircraft and to generate and send signals representing the sensed engine parameters to the engine monitoring device, which stores them as engine performance data. An external device is communicatively connectable to the engine monitoring device to retrieve the engine performance data under certain circumstances.

Specifically, in various embodiments, if both (1) the engine monitoring device determines that the external device is a trusted device and (2) the external device determines that the engine monitoring device is a trusted device, the engine monitoring device is configured to encrypt and securely transmit some or all of the engine performance data to the external device. But if the engine monitoring device determines that the external device is not a trusted device or the external device determines that the engine monitoring device is not a trusted device, the engine monitoring device is configured to not transmit the engine performance data to the external device.

DETAILED DESCRIPTION

Figure 1:
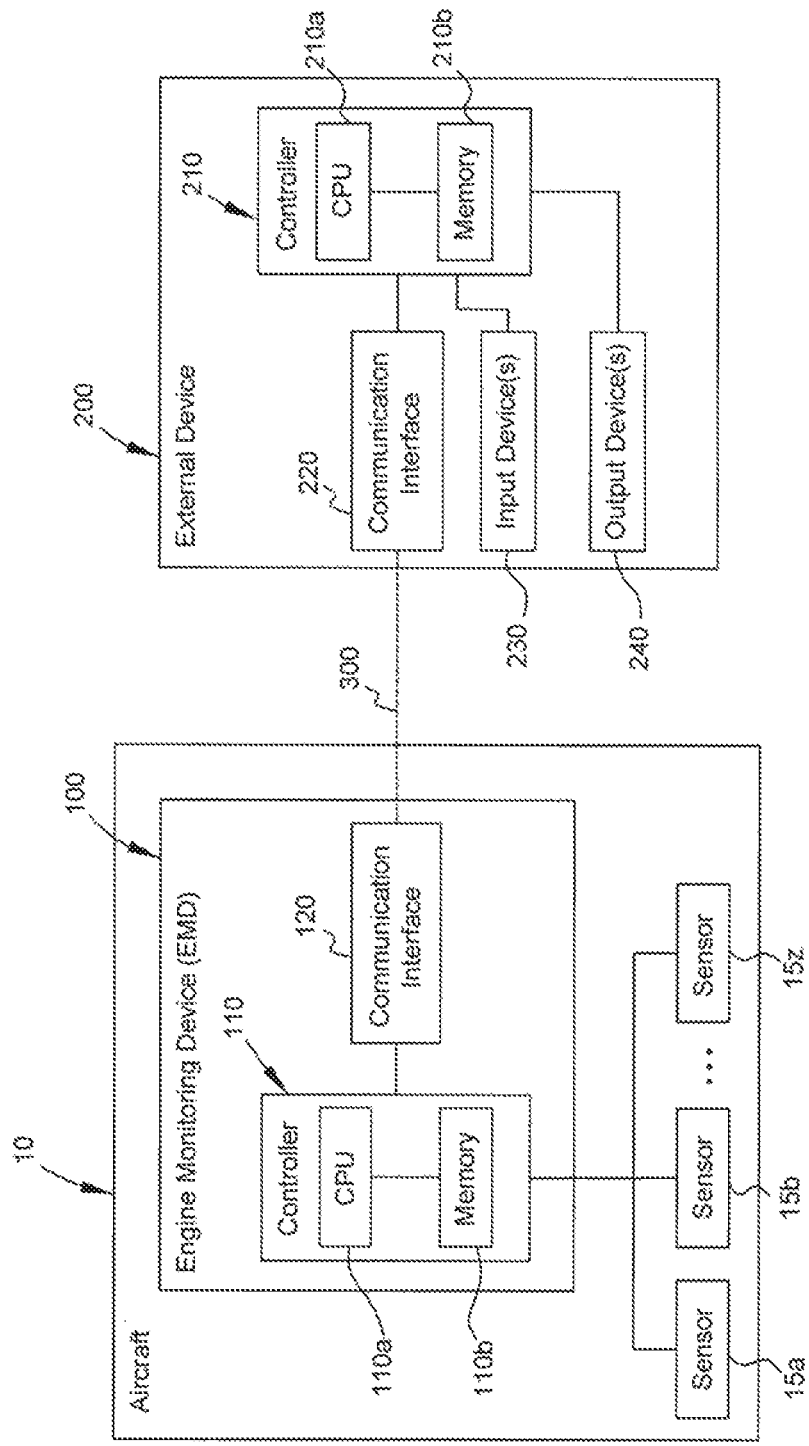
FIG. 1 is a block diagram of the aircraft engine monitoring system of the present disclosure.

While the features, methods, devices, and systems described herein may be embodied in various forms, the drawings show and the detailed description describes some exemplary and non-limiting embodiments. Not all of the components shown in the drawings and described in the detailed descriptions may be required, and some implementations may include additional, different, or fewer components from those expressly shown and described. Variations in the arrangement and type of the components; the shapes, sizes, and materials of the components; and the manners of attachment and connections of the components may be made without departing from the spirit or scope of the claims as set forth herein. This specification is intended to be taken as a whole and interpreted in accordance with the principles of the invention as taught herein and understood by one of ordinary skill in the art.

As shown in FIG. 1, the aircraft engine monitoring system includes an engine monitoring device (EMD) 100 (sometimes called an engine monitoring unit), an external device 200 (sometimes called an EMD ground station), and multiple sensors 15a, 15b, . . . 15z (where z is any suitable number).

Generally, the sensors 15a, 15b, . . . 15z are configured to sense engine parameters of an engine of an aircraft 10 and to generate and send signals representing the sensed engine parameters to the EMD 100, which stores them as engine performance data. The EMD 100 is configured to communicatively connect to the external device 200 and, if both (1) the EMD 100 determines that the external device 200 is a trusted device and (2) the external device 200 determines that the EMD 100 is a trusted device (described below), encrypt and securely transmit some or all of the engine performance data to the external device 200. But if the EMD 100 determines that the external device 200 is not a trusted device or the external device 200 determines that the EMD 100 is not a trusted device, the EMD 100 is configured to not transmit the engine performance data to the external device 200. This ensures that, in this embodiment, the EMD 100 only shares the engine performance data with the external device 200 when mutual trust is established between the two devices.

As generally used herein (and unless otherwise specified), an EMD is a "trusted device" if it includes hardware and/or software configured to engage in encrypted bidirectional data transfer with a trusted external device. As used in the context of this example embodiment, an external device is a "trusted device" if it includes hardware and/or software configured to engage in encrypted bidirectional data transfer with a trusted EMD.

The mutual trust requirement is beneficial for multiple reasons. First, it ensures that the EMD 100 only shares the engine performance data with an external device 200 that it trusts. This prevents an unauthorized third party from accessing the EMD 100 and retrieving the engine performance data, since that third party will not use a trusted external device to communicatively connect to the EMD 100. Second, it ensures that the external device 200 is communicatively connected to the proper device—the EMU 100—and will receive actual engine performance data. This prevents the external device 200 from communicatively connecting to the wrong device and retrieving data that is not the desired engine performance data.

The aircraft 10 may be any suitable aircraft, and the aircraft engine may be any suitable engine. In this illustrated and described embodiment, the aircraft engine is a gas-turbine engine.

The sensors 15a, 15b, . . . 15z are positioned and configured to monitor any suitable parameter of the aircraft engine. In various embodiments, the sensors 15a, 15b, . . . 15z include: a temperature sensor configured to sense temperature, such as the air intake temperature, the low-pressure compressor temperature, the high-pressure compressor temperature, the turbine gas temperature, the turbine cooling air temperature, or the oil temperature; a pressure sensor configured to sense pressure, such as the air intake pressure, the low-pressure compressor pressure, or the high-pressure compressor pressure; a flow sensor configured to sense fluid flow rate, such as air flow rate, fuel flow rate, or oil flow rate; a shaft speed sensor configured to sense shaft speed, such as the speed of one of the turbine shafts; and/or a vibration sensor configured to detect vibration of a particular component, such as a rotating component. These are merely example sensors, and the aircraft monitoring system may include any suitable types of sensors configured to sense any suitable engine parameters. Although the aircraft engine monitoring system includes three or more sensors in this illustrated embodiment, in other embodiments the aircraft engine monitoring system may include any suitable quantity of one or more sensors.

The EMD 100 includes a controller 110 communicatively connected to a communication interface 120. The controller 110 is also communicatively connectable to the sensors 15a, 15b, ... 15z (either directly or indirectly via an intermediary interface or other device) such that the controller 110 can receive the signals representing the sensed engine parameters.

The controller 110 includes a central processing unit (CPU) 110a communicatively connected to a memory 110b. The CPU 110a is configured to execute program code or instructions stored on the memory 110b to control operation of the EMD 100. The CPU 110a may be a microprocessor; a content-addressable memory; a digital-signal processor; an application-specific integrated circuit; a field-programmable gate array; any suitable programmable logic device, discrete gate, or transistor logic; discrete hardware components; or any combination of these. The CPU 110a may also be implemented as a combination of these devices, such as a combination of a digital signal processor and a microprocessor, a plurality of microprocessors, or one or more microprocessors in conjunction with a digital signal processor core.

The memory 110b is configured to store, maintain, and provide data as needed to support the functionality of the EMD 100. For instance, in various embodiments, the memory 110b stores program code or instructions executable by the CPU 110a to control operation of the EMD 100. In this embodiment, the memory 110b includes flash memory (not shown) that is reprogrammable via the (trusted) external device 200, as described below. In other embodiments, the memory includes any suitable data storage device or devices, such as volatile memory (e.g., random-access memory, dynamic random-access memory, or static random-access memory); non-volatile memory (e.g., read-only memory, mask read-only memory, programmable read-only memory, erasable programmable read-only memory, electrically erasable programmable read-only memory); and/or non-volatile random-access memory (e.g., flash memory, solid-state storage).

In certain embodiments, the controller 110 includes a microcontroller with built-in hardware cryptography. When configured properly, this built-in hardware cryptography enables the EMD 100 to engage in encrypted bidirectional data transfer with a trusted external device, thereby rendering the EMD 100 a trusted device (as described below).

The communication interface 120 is configured to (along with the communication interface 220 of the external device 200) establish and enable bidirectional communication between the EMD 100 and the external device 200. In this example embodiment, the communication interface 120 includes a Universal Serial Bus (USB) interface configured to receive a USB connector. In other embodiments, the communication interface includes any suitable interface (and corresponding port, if necessary) instead of or in addition to a USB interface that enables bidirectional communication between the EMD and the external device. In one such embodiment, the communication interface includes a wireless communication interface configured to communicatively connect the EMD to the external device via a suitable wireless communication protocol.

In certain embodiments, the EMD 100 includes a power source, such as a suitable rechargeable or non-rechargeable battery, sufficient to power the components of the EMD 100. The EMD 100 may also or alternatively be electrically connectable to an external power source—such as a power source of the aircraft 10—to power the components of the EMD 100.

In certain embodiments, the EMD 100 is communicatively connected to an engine control system of the aircraft 10 via a shared bus such that the EMD 100 can send the engine performance data to the engine control system. In certain embodiments, the EMD 100 does so periodically during operation of the aircraft 10, the engine control system can use the engine performance data in any of a variety of ways, such as to output (e.g., display) the data, to modify operational aspects of the engine, to log the data for future analysis (like prognostics or diagnostics).

The external device 200 includes a controller 210, a communication interface 220 communicatively connected to the controller 210, one or more input devices 230 communicatively connected to the controller 210, and one or more output devices 240 communicatively connected to the controller 210.

The controller 210 includes a CPU 210a communicatively connected to a memory 210b. The CPU 210a is configured to execute program code or instructions stored on the memory 210b to control operation of the external device 200. The CPU 210a may be a microprocessor; a content-addressable memory; a digital-signal processor; an application-specific integrated circuit; a field-programmable gate array; any suitable programmable logic device, discrete gate, or transistor logic; discrete hardware components; or any combination of these. The CPU 210a may also be implemented as a combination of these devices, such as a combination of a digital signal processor and a microprocessor, a plurality of microprocessors, or one or more microprocessors in conjunction with a digital signal processor core.

The memory 210b is configured to store, maintain, and provide data as needed to support the functionality of the external device 200. For instance, in various embodiments, the memory 210b stores program code or instructions executable by the CPU 210a to control operation of the external device 200. In this embodiment, the memory 210b includes flash memory (not shown) that is reprogrammable via the (trusted) external device 200, as described below. In other embodiments, the memory includes any suitable data storage device or devices, such as volatile memory (e.g., random-access memory, dynamic random-access memory, or static random-access memory); non-volatile memory (e.g., read-only memory, mask read-only memory, programmable read-only memory, erasable programmable read-only memory, electrically erasable programmable read-only memory); and/or non-volatile random-access memory (e.g., flash memory, solid-state storage).

The communication interface 220 is configured to (along with the communication interface 120 of the EMD 100) establish and enable bidirectional communication between the external device 200 and the EMD 100. In this example embodiment, the communication interface 220 includes a USB interface configured to receive a USB connector. In this example embodiment, the EMD 100 and the external device 200 are physically and communicatively connectable via their respective communications interfaces 120 and 220 and a USB cable 300 including appropriate USB connectors.

In other embodiments, the communication interface includes any suitable interface (and corresponding port, if necessary) instead of or in addition to a USB interface that enables bidirectional communication between the external device and the EMD. In one such embodiment, the communication interface includes a wireless communication interface configured to communicatively connect the external device to the EMD via a suitable wireless communication protocol.

The one or more input devices 230 include any suitable input device(s), such as a touch panel, a keyboard, a computer mouse or other pointing device, and/or a microphone. The one or more output devices 240 include any suitable output device(s), such as a display device and/or one or more speakers.

In certain embodiments, the external device 200 includes a power source, such as a suitable rechargeable or non-rechargeable battery, sufficient to power the components of the external device 200. The external device 200 may also or alternatively be electrically connectable to an external power source to power the components of the external device 200.

The sensors 15a, 15b, ... 15z are positioned and configured to sense engine parameters of the aircraft engine of the aircraft 10 during operation of the aircraft engine. The sensors 15a, 15b, ... 15z are configured to generate and send signals representing those sensed engine parameters to the controller 110 of the EMD 100, which stores those engine parameters in its memory 110b as engine performance data. In certain embodiments, the sensors 15a, 15b, ... 15z are configured to transmit the signals representing the sensed engine parameters to the EMD 100 at predetermined intervals (e.g., every quarter of a second, every half of a second, every second, every minute, or any other suitable interval) between engine start-up and shut-down (or during any other suitable period(s) of engine operation). The intervals may vary depending on the type and/or the location of the sensor. In other embodiments, the sensors 15a, 15b, ... 15z are configured to send the signals representing the sensed engine parameters to the EMD 100 substantially in real time. In these embodiments, the EMD 100 samples the engine parameters at predetermined intervals, and stores those engine parameters as engine performance data. For instance, if a pressure sensor sends a sensed pressure reading to the EMD 100 substantially in real time, the EMD 100 does not store all of that data, but instead samples the data every second and stores that sensed pressure reading as engine performance data. In other such embodiments, the EMD 100 stores all of the received engine parameters as engine performance data.

After the aircraft 10 lands and its engine is shut down, a user may desire to retrieve the engine performance data from the memory 110b of the EMD 100. As described below with respect to FIGS. 2A and 2B, a user may communicatively connect the external device 200 to the EMD 100 to retrieve the engine performance data from the EMD 100. In this embodiment, the EMD 100 is configured to encrypt and transfer the engine performance data to the external device 200 only if both (1) the external device 200 determines that the EMD 100 is a trusted device and (2) the EMD 100 determines that the external device 200 is a trusted device (in either order). The EMD 100 is configured to not transfer the engine performance data to the external device 200 if it determines that the external device 200 is not a trusted device or if the external device 200 determines that the EMD 100 is not a trusted device.

Figure 2A:
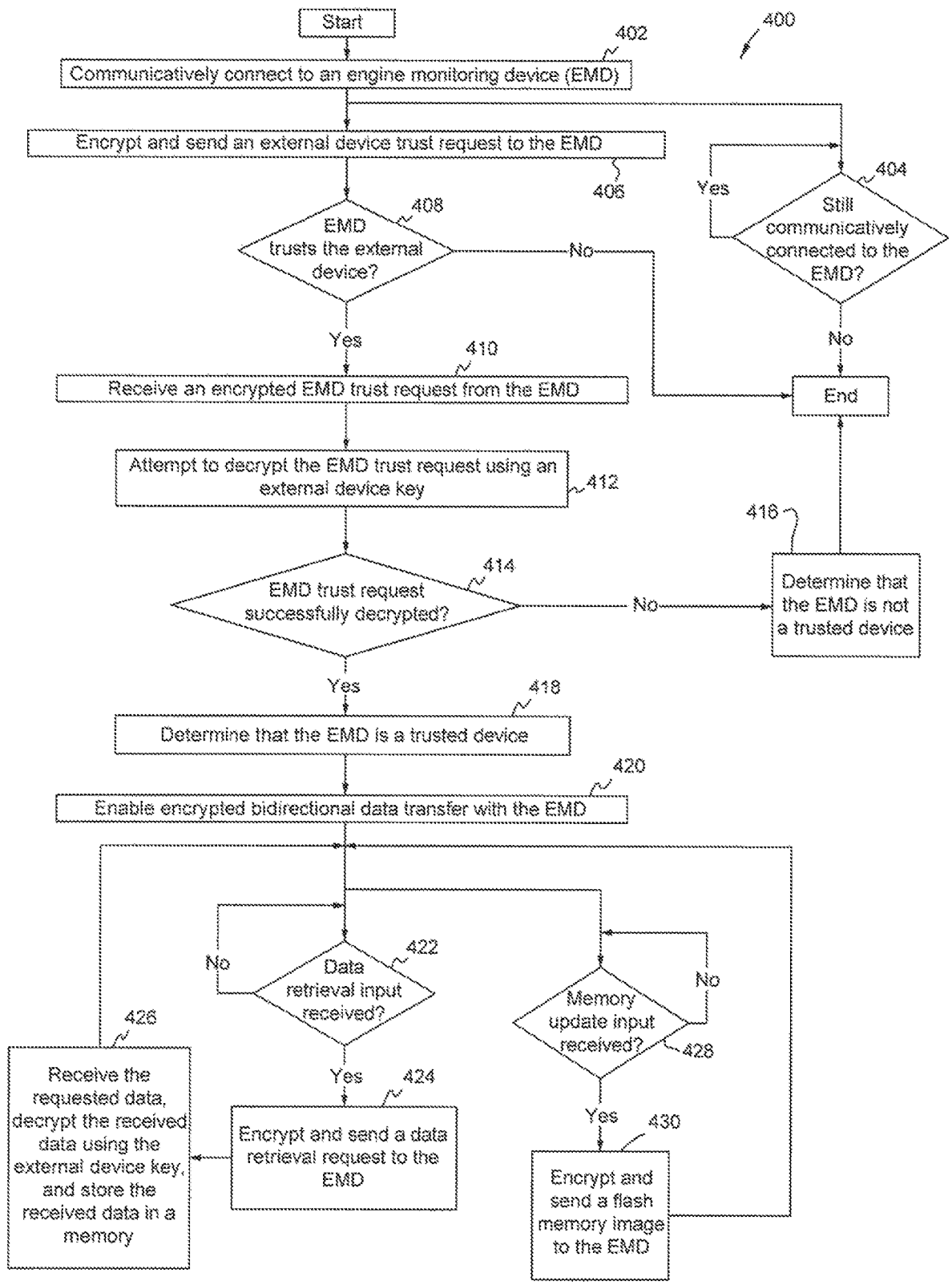
FIG. 2A is a flowchart of an example method of operating the aircraft engine monitoring system of FIG. 1 from the perspective of the external device.
Figure 2B:
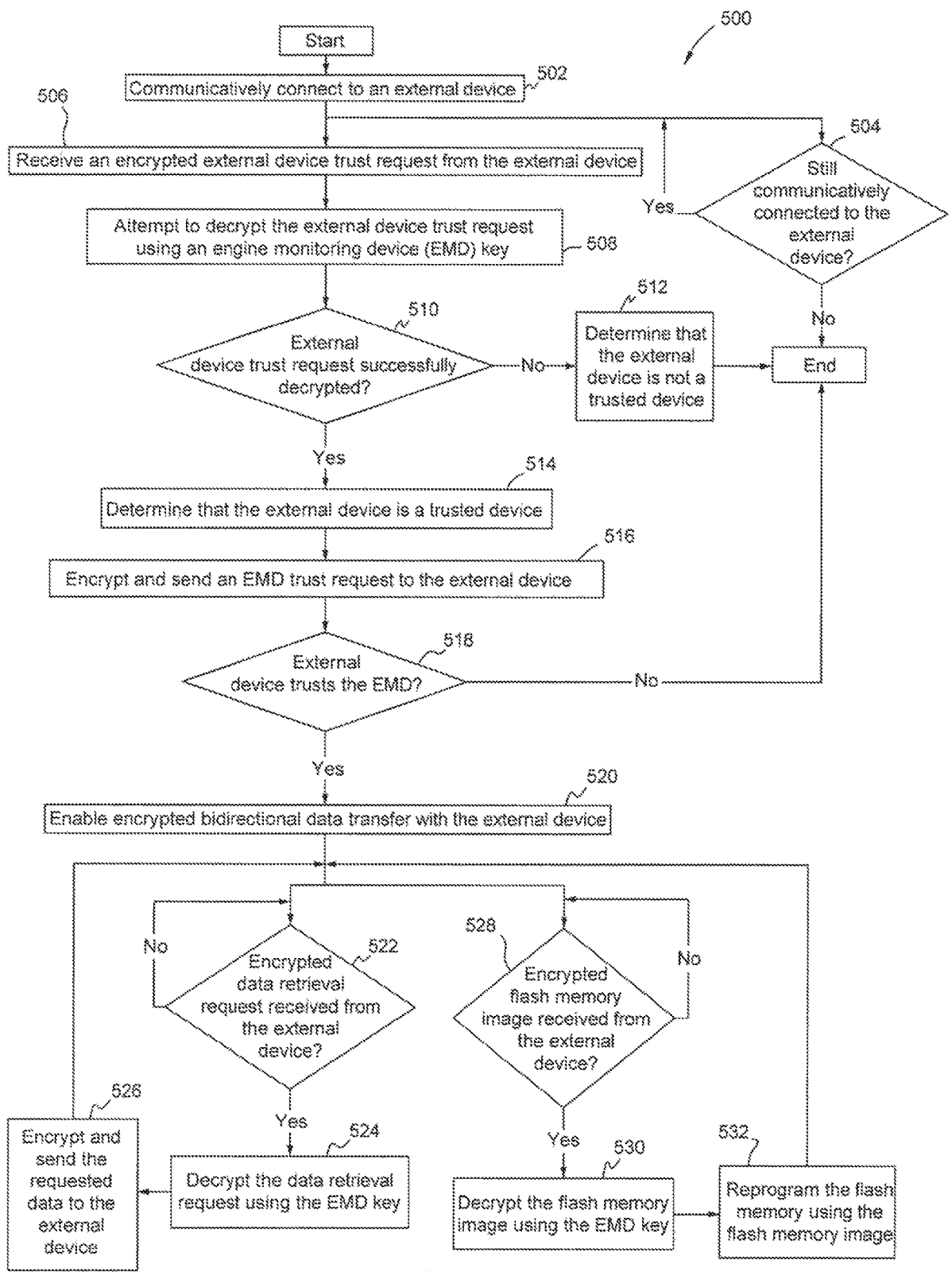
FIG. 2B is a flowchart of an example method of operating the aircraft engine monitoring system of FIG. 1 from the perspective of the engine monitoring device.

Although not shown, the EMD 100 and the external device 200 used in the methods shown in FIGS. 2A and 2B respectively store an EMD key and an external device key. These keys may be stored in the respective memories 110b and 210b of the respective controllers 110 and 210 of the EMD 100 and the external device 200, and in some embodiments are stored within the source code itself. The EMD key and the external device key are configured such that the EMD 100 and the external device 200 can engage in encrypted bidirectional data transfer with one another via a symmetric-key encryption protocol, such as the Advanced Encryption Standard (e.g., AES 128 or AES 256) or any other suitable symmetric-key encryption protocol. In short, and as explained in more detail below, the EMD key enables the EMD 100 to decrypt transmissions (e.g., data and messages) received from the external device 200 (and that were encrypted using the external device key), and the external device key enables the external device 200 to decrypt transmissions (e.g., data and messages) received from the EMD 100 (and that were encrypted using the EMD key).

FIG. 2A is a flowchart of an example process 400 of operating the aircraft engine monitoring system of the present disclosure from the perspective of the external device 200. In various embodiments, a set of instructions stored in the memory 210b and executed by the CPU 210a represents the process 400. Although the process 400 is described with reference to the flowchart shown in FIG. 2A, many other processes of performing the acts associated with this illustrated process 400 may be employed. For example, the order of certain of the illustrated blocks or diamonds may be changed, certain of the illustrated blocks or diamonds may be optional, or certain of the illustrated blocks or diamonds may not be employed.

The process 400 begins with the external device 200 communicatively connecting to the EMD 100, as block 402 indicates. In this example embodiment, this connection is established via a USB cable including USB connectors respectively received by the respective communication interfaces 220 and 120 of the external device 200 and the EMD 100. Afterwards, the external device 200 monitors the status of its connection to the EMD 100, such as via a heartbeat protocol or in any other suitable manner, as diamond 404 indicates. The process 400 ends responsive to the external device 200 determining that it is no longer communicatively connected to the EMD 100. The EMD 100 cannot send the engine performance data to the external device 200 unless it is communicatively connected to the external device 200.

After communicatively connecting to the EMD 100, the external device 200 uses the external device key to encrypt an external device trust request and sends the encrypted external device trust request to the EMD 100, as block 406 indicates. As described below with respect to FIG. 2B, this enables the EMD 100 to determine whether the external device 200 is a trusted device. The external device 200 monitors for a communication from the EMD 100 as to whether the EMD 100 trusts the external device 200, as diamond 408 indicates.

Responsive receiving a communication that the EMD 100 does not trust the external device 200, the process 400 ends. While this would not occur in this example because the EMD key and the external device key are configured such that the EMD 100 and the external device 200 can engage in encrypted bidirectional data transfer with one another via a symmetric-key encryption protocol, this could occur when the EMD key is configured such that the EMD 100 cannot decrypt the encrypted external device trust request using the EMD key. In this embodiment, the EMD 100 is configured to not send the engine performance data to the external device 200 responsive to determining that the external device 200 is not a trusted device.

On the other hand, responsive to receiving a communication that the EMD 100 trusts the external device 200, the external device receives an encrypted EMD trust request from the EMD 100, as block 410 indicates. This enables the external device 200 to determine whether the EMD 100 is a trusted device. To do so, the external device 200 attempts to decrypt the EMD trust request using the external device key, as block 412 indicates. The external device 200 determines whether the EMD trust request was successfully decrypted, as diamond 414 indicates.

Responsive to determining at diamond 414 that the EMD trust request was not successfully decrypted, the external device 200 determines that the EMD is not a trusted device, as block 416 indicates, and the process 400 ends. While this would not occur in this example because the EMD key and the external device key are configured such that the EMD 100 and the external device 200 can engage in encrypted bidirectional data transfer with one another via a symmetric-key encryption protocol, this could occur when the external device key is configured such that the external device 200 cannot decrypt the EMD trust request using the external device key. In this embodiment, the EMD 100 is configured to not send the engine performance data to the external device 200 responsive to the external device 200 determining that the EMD 100 is not a trusted device.

On the other hand, responsive to determining at diamond 414 that the EMD trust request was successfully decrypted, the external device 200 determines that the EMD 100 is a trusted device, as block 418 indicates. Since the external device 200 and the EMD 100 mutually trust each other (i.e., have each determined that the other is a trusted device), the external device 200 enables encrypted bidirectional data transfer with the EMD 100, as block 420 indicates. At this point, the external device 200 monitors for receipt of a data retrieval input, as diamond 422 indicates, and for receipt of a memory update input, as diamond 428 indicates.

Responsive to receipt of the data retrieval input, the external device 200 uses the external device key to encrypt a data retrieval request and sends the encrypted data retrieval request to the EMD 100, as block 424 indicates. The external device 200 then receives the requested engine performance data in an encrypted format, decrypts the received engine performance data using the external device key, and stores the engine performance data in the memory 210*b*, as block 426 indicates. Responsive to receipt of the memory update input, the external device 200 encrypts a flash memory image using the external device key and sends the encrypted flash memory image to the EMD 100, as block 430 indicates. This instructs the EMD 100 to reprogram its flash memory, as described below.

FIG. 2B is a flowchart of an example process 500 of operating the aircraft engine monitoring system of the present disclosure from the perspective of the EMD 100. In various embodiments, a set of instructions stored in the memory 110*b* and executed by the CPU 110*a* represents the process 500. Although the process 500 is described with reference to the flowchart shown in FIG. 2B, many other processes of performing the acts associated with this illustrated process 500 may be employed. For example, the order of certain of the illustrated blocks or diamonds may be changed, certain of the illustrated blocks or diamonds may be optional, or certain of the illustrated blocks or diamonds may not be employed.

The process 500 begins with the EMD 100 communicatively connecting to the external device 200, as block 502 indicates. In this example embodiment, this connection is established via a USB cable including USB connectors respectively received by the respective communication interfaces 220 and 120 of the external device 200 and the EMD 100. Afterwards, the EMD 100 monitors the status of its connection to the external device 200, such as via a heartbeat protocol or in any other suitable manner, as diamond 504 indicates. The process 500 ends responsive to the EMD 100 determining that it is no longer communicatively connected to the external device 200. The external device 200 cannot receive the engine performance data from the EMD 100 unless it is communicatively connected to the EMD 100.

After communicatively connecting to the external device 200, the EMD 100 enters an idle state and awaits receipt of an encrypted external device trust request from the external device 200 (not shown). The encrypted external device trust request enables the EMD 100 to determine whether the external device 200 is a trusted device, as described below. After receiving the encrypted external device trust request from the external device 200, as block 506 indicates, the EMD 100 attempts to decrypt the external device trust request using the EMD key, as block 508 indicates.

The EMD 100 determines whether the external device trust request was successfully decrypted, as diamond 510 indicates. Responsive to determining at diamond 510 that the external device trust request was not successfully decrypted, the EMD 100 determines that the external device 200 is not a trusted device, as block 512 indicates, and the process 500 ends. While this would not occur in this example because the EMD key and the external device key are configured such that the EMD 100 and the external device 200 can engage in encrypted bidirectional data transfer with one another via a symmetric-key encryption protocol, this could occur when the EMD key is configured such that the EMD 100 cannot decrypt the external device trust request using the EMD key. In this embodiment, the EMD 100 is configured to not send the engine performance data to the external device 200 responsive to determining that the external device 200 is not a trusted device.

On the other hand, responsive to determining at diamond 510 that the external device trust request was successfully decrypted, the EMD 100 determines that the external device 200 is a trusted device, as block 514 indicates. The EMD 100 encrypts an EMD trust request using the EMD key and sends the encrypted EMD trust request to the external device 200, as block 516 indicates. As described above with respect to FIG. 2A, this enables the external device 200 to determine whether the EMD 100 is a trusted device. The EMD 100 monitors for a communication from the external device 200 as to whether the external device 200 trusts the EMD 100, as diamond 518 indicates.

Responsive to receiving a communication that the external device 200 does not trust the EMD 100, the process 500 ends. While this would not occur in this example because the EMD key and the external device key are configured such that the EMD 100 and the external device 200 can engage in encrypted bidirectional data transfer with one another via a symmetric-key encryption protocol, this could occur when the external device key is configured such that the external device 200 cannot decrypt the encrypted EMD trust request using the external device key.

On the other hand, responsive to determining at diamond 518 that the external device 200 trusts the EMD 100, the EMD 100 enables encrypted bidirectional data transfer with the external device 200 since the external device 200 and the EMD 100 mutually trust each other (i.e., have each determined that the other is a trusted device), as block 520 indicates. At this point, the EMD 100 monitors for receipt of an encrypted data retrieval request, as diamond 522 indicates, and for receipt of an encrypted flash memory image, as diamond 528 indicates.

Responsive to receipt of the encrypted data retrieval request from the external device 200, the EMD 100 decrypts the data retrieval request using the EMD key, as block 524 indicates. The EMD 100 then encrypts the requested data using the EMD key and sends the requested data to the external device 200, as block 526 indicates. In other embodiments, the EMD 100 is configured to encrypt data before storing the data. That is, the data encryption may occur before or after the EMD 100 and the external device 200 trust one another or before or after the EMD 100 receives the encrypted data retrieval request.

Responsive to receipt of the encrypted flash memory image from the external device 200, the EMD 100 decrypts the flash memory image using the EMD key, as block 530 indicates. The EMD 100 then reprograms its flash memory (e.g., by flashing the firmware) using the flash memory image, as block 532 indicates.

While the example embodiment of the aircraft engine monitoring system described with respect to the processes 400 and 500 respectively shown in FIGS. 2A and 2B uses a symmetric-key encryption algorithm, in other embodiments the aircraft engine monitoring system may use any suitable encryption protocol (whether key-based or not) to establish trust between the EMD and the external device and to encrypt and decrypt transmissions between the two devices.

In some embodiments, data retrieval software must be installed on the external device—such as on its memory—and executed before the external device can request the engine performance data from the EMD. That is, in these embodiments, the data retrieval software configures the external device to provide a user interface the user can use to control the external device to retrieve the engine performance data from the EMD. The data retrieval software thus offers another layer of security, as in these embodiments the EMD will not respond to the external device (and will therefore fail to transfer the engine performance data) unless the external device is executing the data retrieval software while communicating with the EMD. Also, in certain embodiments the data retrieval software is only accessible (and executable) by authorized users who must identify themselves with suitable login information, such as via a username/password combination or via biometric identification. This adds yet another layer of security to help prevent unauthorized transfer of the engine performance data.

In other embodiments, the EMD is configured to communicatively connect to the external device and, if the EMD determines that the external device is a trusted device, encrypt and securely transmit some or all of the engine performance data to the external device. In these embodiments, the EMD does not need to confirm that the external device trusts the EMD before transmitting the engine performance data. In certain such embodiments, the external device does not determine whether to trust the EMD.

In various embodiments, a method of operating an aircraft engine monitoring system comprises receiving, by an engine monitoring device of an aircraft and from a sensor of the aircraft, a signal representing a sensed engine parameter; storing, by the engine monitoring device, the engine parameter as engine performance data; communicatively connecting the engine monitoring device of the aircraft to an external device; determining, by the engine monitoring device, whether the external device is a trusted device; determining, by the external device, whether the engine monitoring device is a trusted device; and after both: the engine monitoring device determines that the external device is a trusted device; and the external device determines that the engine monitoring device is a trusted device, encrypting, by the engine monitoring device, the engine performance data and sending, by the engine monitoring device, the encrypted engine performance data to the external device.

In one such embodiment, the method further comprises preventing the encrypted engine performance data from being sent to the external device if one or both of: the engine monitoring device determines that the external device is not a trusted device; and the external device determines that the engine monitoring device is not a trusted device.

In another such embodiment, the method further comprises sending, by the external device, an encrypted external device trust request to the engine monitoring device; and attempting, by the engine monitoring device, to decrypt the encrypted external device trust request.

In another such embodiment, determining, by the engine monitoring device, whether the external device is a trusted device comprises determining, by the engine monitoring device, that the external device is a trusted device responsive to the engine monitoring device successfully decrypting the encrypted external device trust request; and determining, by the engine monitoring device, that the external device is not a trusted device responsive to the engine monitoring device failing to decrypt the encrypted external device trust request.

In another such embodiment, the method further comprises attempting, by the engine monitoring device, to decrypt the encrypted external device trust request comprises attempting, by the engine monitoring device, to decrypt the encrypted external device trust request via use of an engine monitoring device key stored on a memory of the engine monitoring device.

In another such embodiment, the method further comprises sending, by the engine monitoring device, an encrypted engine monitoring device trust request to the external device; and attempting, by the external device, to decrypt the encrypted engine monitoring device trust request.

In another such embodiment, determining, by the external device, whether the engine monitoring device is a trusted device comprises: determining, by the external device, that the engine monitoring device is a trusted device responsive to the external device successfully decrypting the encrypted engine monitoring device trust request; and determining, by the external device, that the engine monitoring device is not a trusted device responsive to the external device failing to decrypt the encrypted engine monitoring device trust request.

In another such embodiment, attempting, by the external device, to decrypt the encrypted engine monitoring device trust request comprises attempting, by the external device, to decrypt the encrypted engine monitoring device trust request via use of an external device key stored on a memory of the external device.

In another such embodiment, the method further comprises, responsive to both: the engine monitoring device determining that the external device is a trusted device; and the external device determining that the engine monitoring device is a trusted device: enabling, by the engine monitoring device, bidirectional encrypted data transfer with the external device; and enabling, by the external device, bidirectional encrypted data transfer with the engine monitoring device.

In another such embodiment, the method further comprises receiving, by the engine monitoring device and from the external device, an encrypted flash memory image; decrypting, by the engine monitoring device, the flash memory image; and reformatting, by the engine monitoring device, a flash memory of the engine monitoring device using the flash memory image.

In various embodiments, an aircraft engine monitoring device comprises a central processing unit; a communication interface communicatively connected to the central processing unit; and a memory communicatively connected to the central processing unit, the memory storing instructions that, when executed by the central processing unit, cause the central processing unit to, after an external device is communicatively connected to the communication interface: determine whether the external device is a trusted device; determine whether the external device has determined that the aircraft engine monitoring device is a trusted device; and after determining that the external device is a trusted device and determining that the external device has determined that the aircraft engine monitoring device is a trusted device, send, via the communication interface, encrypted engine performance data to the external device.

In one such embodiment, the instructions, when executed by the central processing unit, cause the central processing unit to prevent the encrypted engine performance data from being sent to the external device if one or both of: it has been determined that the external device is not a trusted device; and it has been determined that the external device has determined that the aircraft engine monitoring device is not a trusted device.

In another such embodiment, the instructions, when executed by the central processing unit, cause the central processing unit to, responsive to receiving, via the communication interface, an encrypted external device trust request from the external device, attempt to decrypt the encrypted external device trust request.

In another such embodiment, the instructions, when executed by the central processing unit, cause the central processing unit to determine whether the external device is a trusted device by: determining that the external device is a trusted device responsive to successfully decrypting the encrypted external device trust request; and determining that the external device is not a trusted device responsive to failing to decrypt the encrypted external device trust request.

In another such embodiment, the memory stores an aircraft engine monitoring device key, and the instructions, when executed by the central processing unit, cause the central processing unit to attempt to decrypt the encrypted external device trust request by attempting to decrypt the encrypted external device trust request via use of the aircraft engine monitoring device key.

In various embodiments, an aircraft comprises an engine; a sensor configured to sense an engine parameter of the engine and to generate and send a signal representing the engine parameter to an engine monitoring device; an engine control system; a bus; and the engine monitoring device communicatively connected to the engine control system via the bus, the engine monitoring device comprising: a central processing unit; a communication interface communicatively connected to the central processing unit; and a memory communicatively connected to the central processing unit, the memory storing instructions that, when executed by the central processing unit, cause the central processing unit to: store the engine parameter in the memory as engine performance data; send the engine performance data to the engine control system via the bus; and after an external device is communicatively connected to the communication interface: determine whether the external device is a trusted device; determine whether the external device has determined that the aircraft engine monitoring device is a trusted device; and after determining that the external device is a trusted device and determining that the external device has determined that the aircraft engine monitoring device is a trusted device, encrypt the engine performance data and send, via the communication interface, the encrypted engine performance data to the external device.

In one such embodiment, the instructions, when executed by the central processing unit, cause the central processing unit to prevent the encrypted engine performance data from being sent to the external device if one or both of: it has been determined that the external device is not a trusted device; and it has been determined that the external device has determined that the aircraft engine monitoring device is not a trusted device.

In another such embodiment, the instructions, when executed by the central processing unit, cause the central processing unit to, responsive to receiving, via the communication interface, an encrypted external device trust request from the external device, attempt to decrypt the encrypted external device trust request.

In another such embodiment, the instructions, when executed by the central processing unit, cause the central processing unit to determine whether the external device is a trusted device by: determining that the external device is a trusted device responsive to successfully decrypting the encrypted external device trust request; and determining that the external device is not a trusted device responsive to failing to decrypt the encrypted external device trust request.

In another such embodiment, the memory stores an aircraft engine monitoring device key, and the instructions, when executed by the central processing unit, cause the central processing unit to attempt to decrypt the encrypted external device trust request by attempting to decrypt the encrypted external device trust request via use of the aircraft engine monitoring device key.

Various modifications to the embodiments described herein will be apparent to those skilled in the art. These modifications can be made without departing from the spirit and scope of the present disclosure and without diminishing its intended advantages. It is intended that such changes and modifications be covered by the appended claims.

What I claim is:

1. A method of operating an aircraft engine monitoring system, the method comprising:
receiving, by an engine monitoring device of an aircraft and from a sensor of the aircraft engine, a signal representing a sensed engine parameter, the engine monitoring device being communicatively coupled to an engine control system via a shared bus, the engine control system controlling the aircraft engine;

storing, by the engine monitoring device, the engine parameter as engine performance data at predetermined intervals of time;

sending, by the engine monitoring device, the engine performance data to the engine control system periodically during operation of the aircraft engine;

communicatively connecting the engine monitoring device of the aircraft to an external device, each of the engine monitoring device and the external device storing a symmetric key in memory;

determining, by the engine monitoring device, with a respective symmetric key stored in memory of the engine monitoring device, whether the external device is a trusted device, wherein a trusted device includes hardware and/or software configured to engage in encrypted bidirectional data transfer using a symmetric-key encryption protocol;

determining, by the external device, with a respective symmetric key stored in memory of the external device, whether the engine monitoring device is a trusted device; and following the determination by the engine monitoring device that the external device is a trusted device, and following the determination by the external device that the engine monitoring device is a trusted device, encrypting, by the engine monitoring device, with the respective symmetric key stored in memory of the engine monitoring device, the engine performance data and sending, by the engine monitoring device, the encrypted engine performance data to the external device wherein the external device is external to the aircraft and ground base;

decrypting, by the engine monitoring device, an encrypted flash memory image received from the external device, the encrypted flash memory image encrypted with the respective symmetric key stored in memory of the external device; and reprogramming a flash memory included in the engine monitoring device via the decrypted flash memory image received from the external device.

2. The method of claim 1, further comprising preventing the encrypted engine performance data from being sent to the external device if one or both of: the engine monitoring device determines that the external device is not a trusted device; and the external device determines that the engine monitoring device is not a trusted device.

3. The method of claim 1, further comprising:
sending, by the external device, an encrypted external device trust request to the engine monitoring device; and
attempting, by the engine monitoring device, to decrypt the encrypted external device trust request with the symmetric key stored in the engine monitoring device.

4. The method of claim 3, wherein determining, by the engine monitoring device, whether the external device is a trusted device comprises:
determining, by the engine monitoring device, that the external device is a trusted device responsive to the engine monitoring device successfully decrypting the encrypted external device trust request; and
determining, by the engine monitoring device, that the external device is not a trusted device responsive to the engine monitoring device failing to decrypt the encrypted external device trust request.

5. The method of claim 1, further comprising sending, by the engine monitoring device, an encrypted engine monitoring device trust request to the external device; and attempting, by the external device, to decrypt the encrypted engine monitoring device trust request with the respective symmetric key stored in memory of the external device.

6. The method of claim 5, wherein determining, by the external device, whether the engine monitoring device is a trusted device comprises:
determining, by the external device, that the engine monitoring device is a trusted device responsive to the external device successfully decrypting the encrypted engine monitoring device trust request; and
determining, by the external device, that the engine monitoring device is not a trusted device responsive to the external device failing to decrypt the encrypted engine monitoring device trust request.

7. The method of claim 1, further comprising, responsive to the engine monitoring device determining that the external device is a trusted device, and responsive to the external device determining that the engine monitoring device is a trusted device:
enabling, by the engine monitoring device, bidirectional encrypted data transfer with the external device; and
enabling, by the external device, bidirectional encrypted data transfer with the engine monitoring device.

8. The method of claim 1,
wherein decrypting, by the engine monitoring device, the encrypted flash memory image further comprises
reformatting, by the engine monitoring device, the flash memory of the engine monitoring device using the decrypted flash memory image.

9. An aircraft engine monitoring device comprising:
a central processing unit;
a communication interface communicatively connected to the central processing unit; and
a memory communicatively connected to the central processing unit, the memory storing instructions that, when executed by the central processing unit, cause the central processing unit to;
control operation of the aircraft engine monitoring device to receive sensor data from a plurality of engine sensors monitoring an aircraft engine;
store the sensor data as engine performance data in the memory;
communicate the engine performance data to an engine control system configured to control operation of the aircraft engine; and
after an external device is communicatively connected to the communication interface the instructions, when executed by the central processing unit, cause the central processing unit to:
determine whether the external device is a trusted device using a symmetric key stored in the memory, wherein a trusted device includes hardware and/or software configured to engage in encrypted bidirectional data transfer using a symmetric-key encryption protocol;
determine whether the external device has determined, by using a symmetric key stored in memory of the external device, that the aircraft engine monitoring device is a trusted device;
after determining that the external device is a trusted device and determining that the external device has determined that the aircraft engine monitoring device is a trusted device;
encrypt, with the symmetric key stored in the memory, the engine performance data;
send, via the communication interface, the encrypted engine performance data to the external device, wherein the external device is external to an aircraft containing the memory, and is ground based;
decrypt an encrypted flash memory image received from the external device, the encrypted flash memory image encrypted with the symmetric key stored in memory of the external device; and
reprogram a flash memory included in the memory, the flash memory reprogrammed via the decrypted flash memory image received from the external device.

10. The aircraft engine monitoring device of claim 9, wherein the instructions, when executed by the central processing unit, cause the central processing unit to prevent the encrypted engine performance data from being sent to the external device if the external device is determined to not be a trusted device or the external device has determined that the aircraft engine monitoring device is not a trusted device.

11. The aircraft engine monitoring device of claim 9, wherein the instructions, when executed by the central processing unit, cause the central processing unit to, responsive to receiving, via the communication interface, an encrypted external device trust request from the external device, attempt to decrypt the encrypted external device trust request with the symmetric key stored in the memory.

12. The aircraft engine monitoring device of claim 11, wherein the instructions, when executed by the central processing unit, cause the central processing unit to:
determine whether the external device is a trusted device by:
confirm that the external device is a trusted device responsive to successfully decrypting the encrypted external device trust request; and
confirm that the external device is not a trusted device responsive to failing to decrypt the encrypted external device trust request.

13. An aircraft comprising:
an engine;
a sensor configured to sense an engine parameter of the engine and to generate and send a signal representing the engine parameter to an engine monitoring device;
an engine control system;
a bus; and
the engine monitoring device communicatively connected to the engine control system via the bus, the engine monitoring device comprising:
a central processing unit;
a communication interface communicatively connected to the central processing unit; and
a memory communicatively connected to the central processing unit, the memory storing instructions that, when executed by the central processing unit, cause the central processing unit to:
store the engine parameter in the memory as engine performance data;
send the engine performance data to the engine control system via the bus; and
after an external device is communicatively connected to the communication interface:
determine whether the external device is a trusted device using a symmetric key stored in the memory, wherein a trusted device includes hardware and/or software configured to engage in encrypted bidirectional data transfer using a symmetric-key encryption protocol;
determine whether the external device has determined, by using a symmetric key stored in memory of the external device, that the engine monitoring device is a trusted device;
after confirmation that the external device is a trusted device and that the external device has determined that the engine monitoring device is a trusted device:
encrypt with the symmetric key stored in the memory, the engine performance data, and
send, via the communication interface, the encrypted engine performance data to the external device, wherein the external device is external to the aircraft and ground based;
decrypt an encrypted flash memory image received from the external device, the encrypted flash memory image encrypted with the symmetric key stored in memory of the external device; and
reprogram a flash memory included in the memory, the flash memory reprogrammed via the decrypted flash memory image received from the external device.

14. The aircraft of claim 13, wherein the instructions, when executed by the central processing unit, cause the central processing unit to prevent the encrypted engine performance data from being sent to the external device in response to confirmation that the external device is not a trusted device or confirmation that the external device has determined that the engine monitoring device is not a trusted device.

15. The aircraft of claim 13, wherein the instructions, when executed by the central processing unit, cause the central processing unit to, responsive to receiving, via the communication interface, an encrypted external device trust request from the external device, attempt to decrypt the encrypted external device trust request using the symmetric key stored in the memory.

16. The aircraft of claim 15, wherein the instructions, when executed by the central processing unit, cause the central processing unit to:
determine whether the external device is a trusted device by:
confirmation that the external device is a trusted device responsive to successfully decrypting the encrypted external device trust request; and
confirmation that the external device is not a trusted device responsive to failing to decrypt the encrypted external device trust request.

* * * * *